(12) United States Patent
Genevois

(10) Patent No.: US 7,400,728 B2
(45) Date of Patent: Jul. 15, 2008

(54) CONDITIONAL ACCESS SYSTEM AND COPY PROTECTION

(75) Inventor: Christophe Genevois, La Cadiere d'Azur (FR)

(73) Assignee: SmarDTV SA, Cheseaux-sur-Lausanne (CH)

( * ) Notice: Subject to any disclaimer, the term of this patent is extended or adjusted under 35 U.S.C. 154(b) by 718 days.

(21) Appl. No.: 10/492,759

(22) PCT Filed: Oct. 18, 2002

(86) PCT No.: PCT/EP02/11699

§ 371 (c)(1),
(2), (4) Date: Aug. 18, 2004

(87) PCT Pub. No.: WO03/036975

PCT Pub. Date: May 1, 2003

(65) Prior Publication Data

US 2004/0250274 A1    Dec. 9, 2004

(30) Foreign Application Priority Data

Oct. 19, 2001 (DE) .............................. 201 17 169 U

(51) Int. Cl.
H04L 9/00 (2006.01)
(52) U.S. Cl. ....................................................... 380/210
(58) Field of Classification Search .................. 380/210, 380/227; 713/154; 705/57
See application file for complete search history.

(56) References Cited

U.S. PATENT DOCUMENTS

| 5,742,681 | A | 4/1998 | Giachetti et al. |
| 6,021,199 | A | 2/2000 | Ishibashi |
| 6,466,671 | B1 * | 10/2002 | Maillard et al. ............. 380/227 |
| 6,611,607 | B1 * | 8/2003 | Davis et al. ................. 382/100 |
| 6,668,246 | B1 * | 12/2003 | Yeung et al. .................. 705/57 |
| 7,165,175 | B1 * | 1/2007 | Kollmyer et al. ............ 713/154 |

FOREIGN PATENT DOCUMENTS

EP      0 730 380 A1     9/1996
WO      WO 01 65762 A2   9/2001

OTHER PUBLICATIONS

"Functional Model of a Conditional Access System", EBU Review Technical, European Broadcasting Union, Winter, No. 266 (1995).

* cited by examiner

Primary Examiner—Kambiz Zand
Assistant Examiner—Andrew L Nalven
(74) Attorney, Agent, or Firm—Stuart J. Friedman

(57) ABSTRACT

A conditional access system is provided wherein digitized data are received in successive data packets at least some of which are scrambled. The digitized data contain content data and access control data. The system has a module with descrambler circuitry and a security device such as a smart card adapted to be coupled to the module to provide descrambling control data to the module as derived from the access control data. Selected ones of the data packets are encrypted in addition to being scrambled, and the access control data include decryption control data.

18 Claims, 6 Drawing Sheets

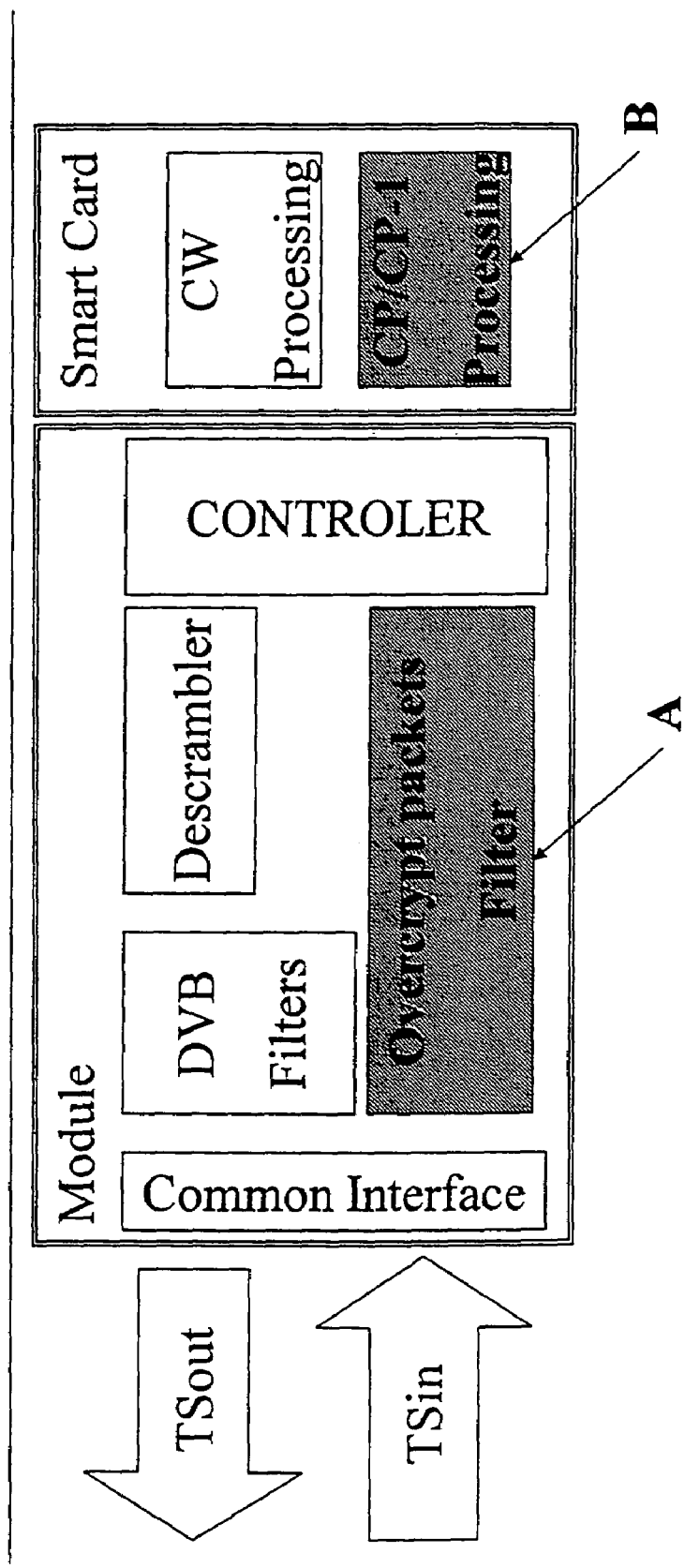
Fig1 : Functional Blocs

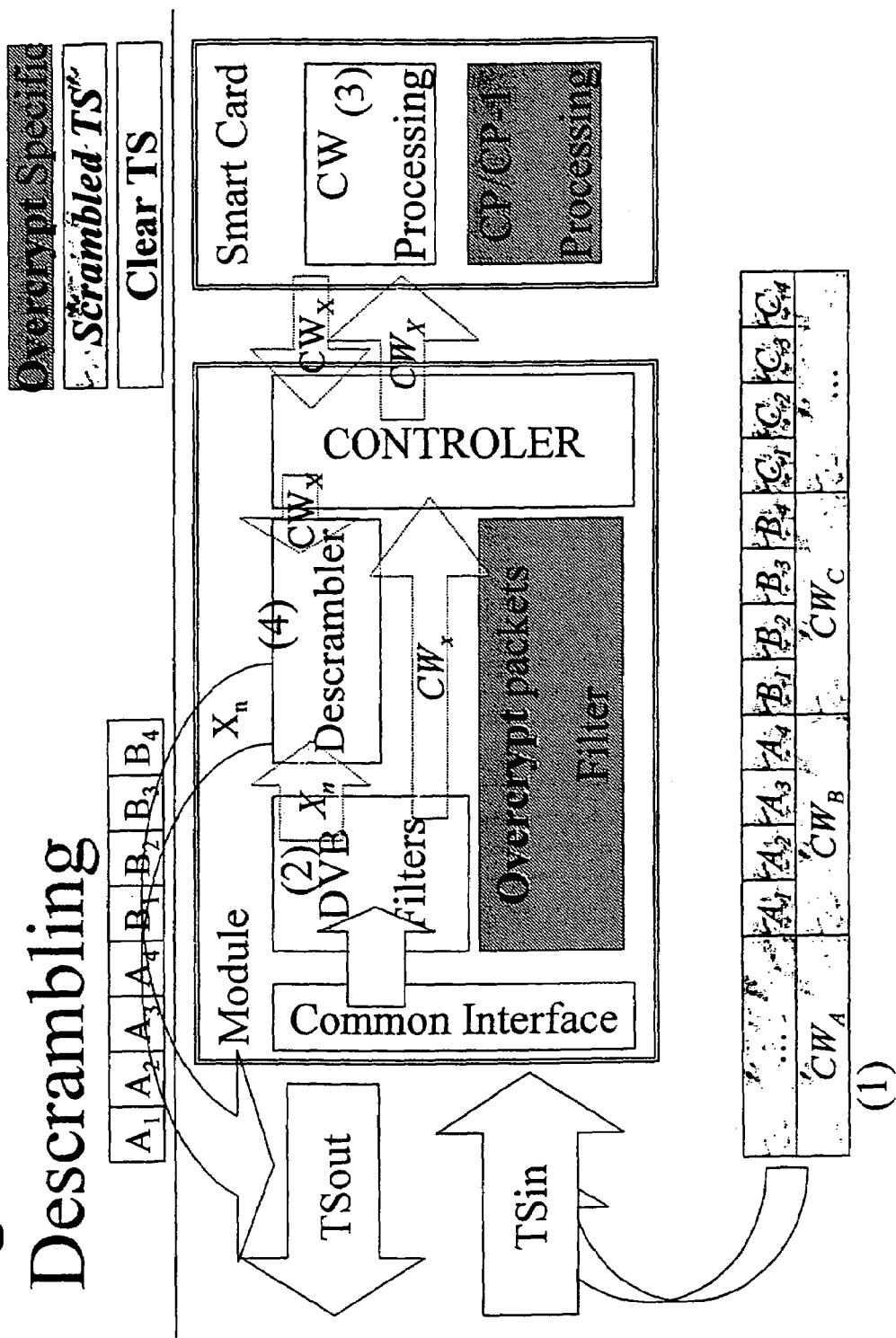
Fig 2 : Standard Descrambling

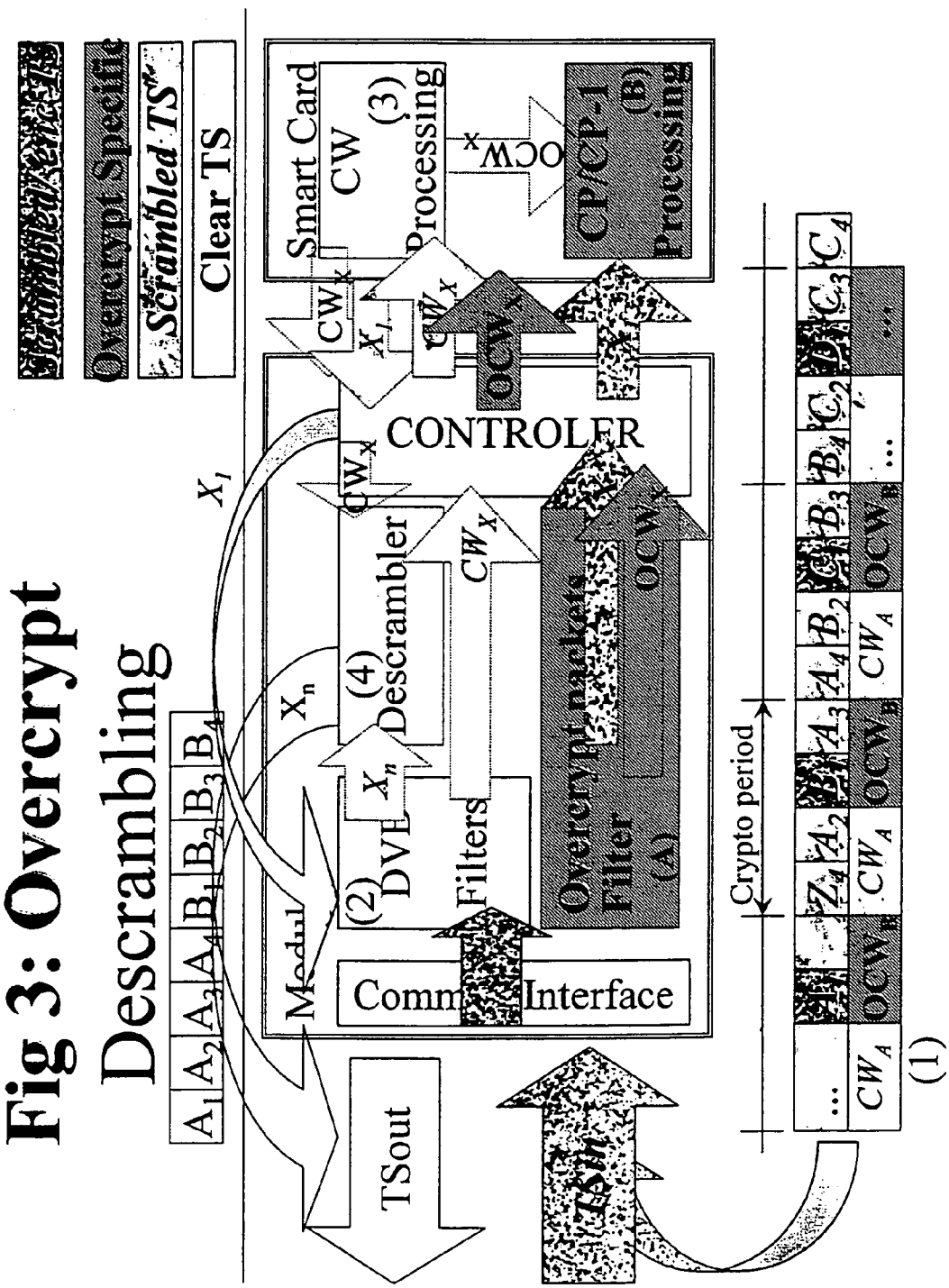

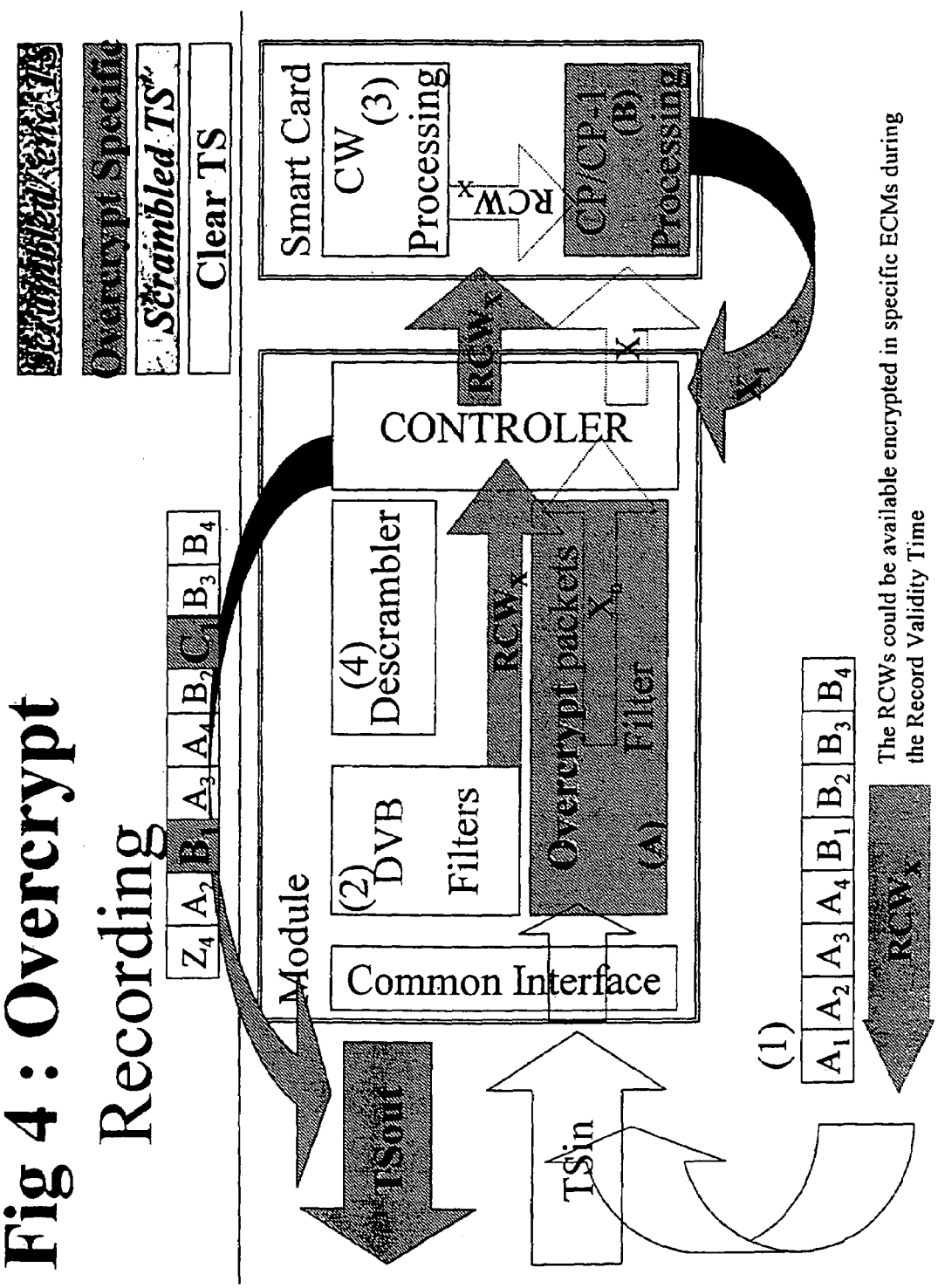

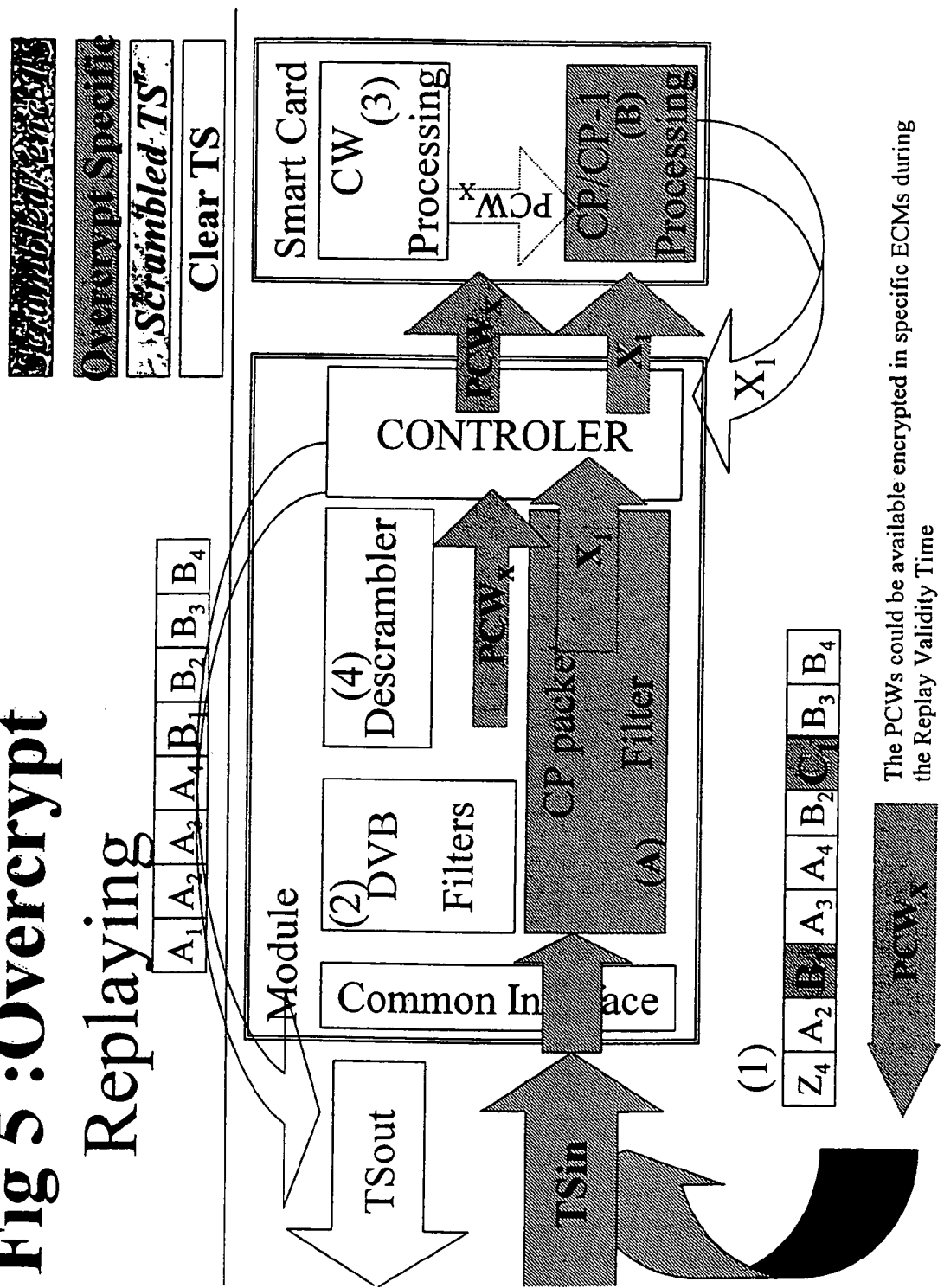

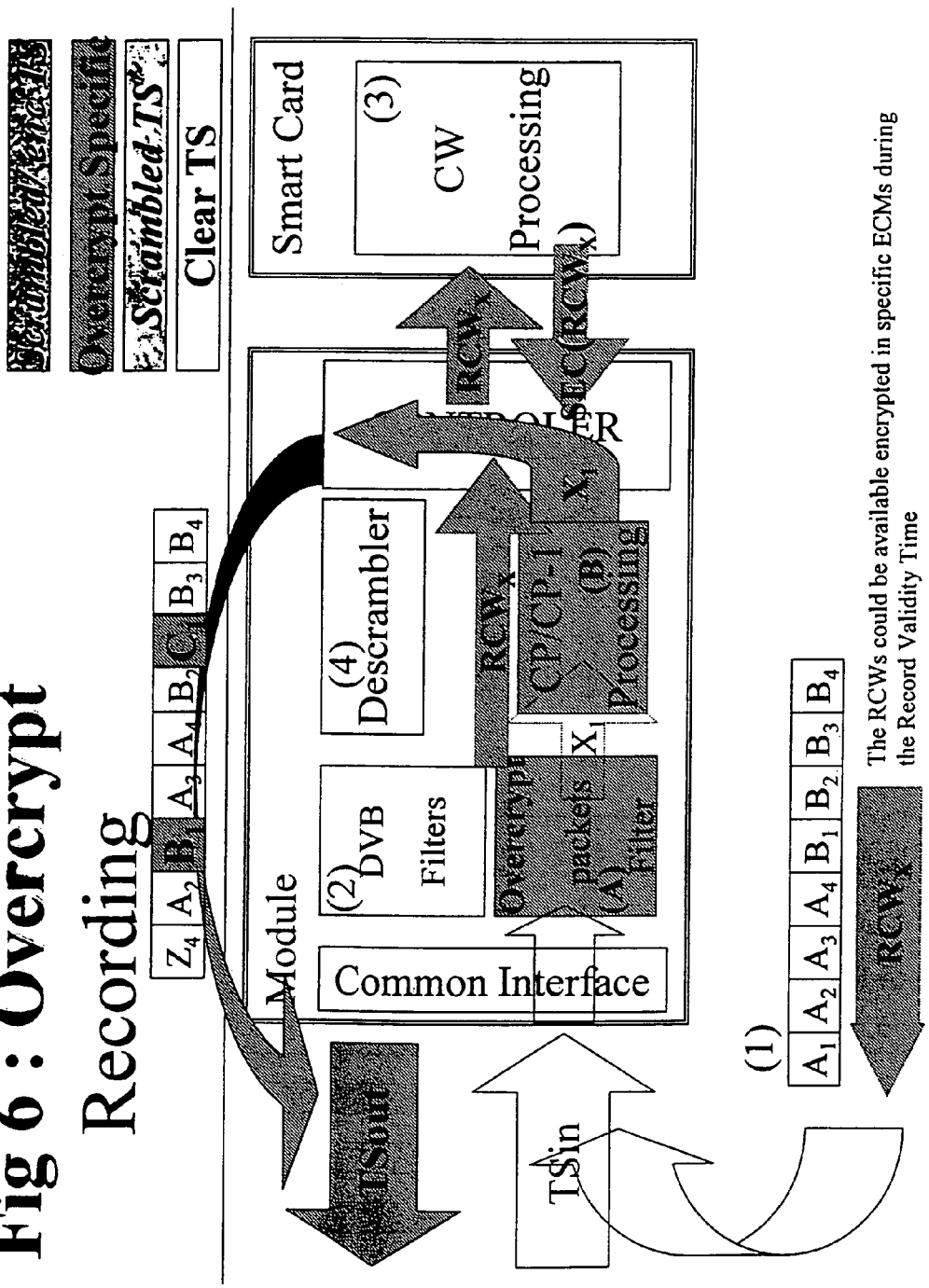
Fig 6 : Overcrypt Recording

CONDITIONAL ACCESS SYSTEM AND COPY PROTECTION

The present invention relates to a conditional access system and to a copy protection management system.

In a conventional conditional access system, such as for the DVB for example, a conditional access module receives, via cable or satellite, a transport stream consisting of successive digital data packets. The data packets include content data such as audio, video data and access control data. In addition to being encoded for data compression, the content data intended for conditional access are scrambled. The access control data are filtered out by the module and sent to a security device such as a smart card that is coupled to the module. The access control data are received in advance of corresponding content data, and the security device is used to derive appropriate descrambling keys (referred to as control words) if the access conditions are satisfied. The descrambling keys are supplied to the conditional access module that includes the required descrambling circuitry. The conditional access module outputs a descrambled transport stream for further processing in a decoder. The decoder converts compressed content data to an appropriate audio and video format.

Although the security device (smart card) is considered to provide a high level of security since the security functions are confined within the device, attempts to gain unauthorised access have been successful. The spying of the smart card output has been successful to recover clear CW and to communicate it to a large number of non authorized viewer through internet. There is thus a need to further increase the level of security in existing conditional access systems. In addition, as mass storage media of high storage capacity become available, there is a need to add copy protection to content data after they have been descrambled.

The present invention satisfies both requirements with only minor changes to the existing systems.

Specifically, the invention provides a conditional access system wherein digitized data are received in successive data packets at least some of which are scrambled. The digitized data contain content data and access control data. The system comprises a module detachable or not with descrambler circuitry and a security device adapted to be coupled to the module to provide descrambling control data to the module as derived from the access control data. Selected ones of the data packets are encrypted in addition to being scrambled, and the access control data include decryption control data. In order to make the additional encryption of selected data packets as effective as possible, the content data are analysed to determine essential data and less essential data, and the selected data packets are those containing essential content data.

In the preferred embodiment, the selected data packets prior to being descrambled are decrypted using the decryption control data, and the decryption control data are derived by the security device. For optimum security, the security device should also perform the required decryption of the selected data packets. In view of the limited processing capacity and speed of available security devices such as a smart card, the selected data packets are received in advance of contiguous content data, and the number of selected data packets is relatively small in comparison to the number of all other data packets. An efficient protection is nevertheless ensured by selecting data packets that correspond to essential content data. In a video movie, for example, essential content data could correspond to background frames.

According to a further aspect of the invention, a copy protection management system for data streams consisting of successive data packets is provided. The system includes a conditional access module and a security device coupled to the conditional access module. A stream of data packets is analysed to determine essential data and less essential data. Data packets containing essential data are selected and encrypted. A stream of clear data packets and encrypted data packets is combined wherein the encrypted data packets are advanced in time with respect to clear data packets containing contiguous content data. The combined data stream is stored on a mass storage media along with copy protection control data. For replay, the combined data stream is read from the mass storage media. The encrypted data packets are determined and decrypted using decryption control data derived from the copy protection data. The decrypted data packets are combined with other data packets of the data stream read from the storage media to provide an output stream of clear data packets.

Further details of the invention are apparent from the following description and from the enclosed drawings.

In the drawings:

FIG. 1 shows the functional blocks of conditional access system with the invention's decryption means implemented;

FIG. 2 illustrates the standard descrambling procedure;

FIG. 3 illustrates the inventive encryption/decryption system, referred to as "Overcrypt Descrambling";

FIG. 4 illustrates the inventive recording system, referred to as "Overcrypt Recording";

FIG. 5 illustrates the inventive playback system, referred to as "Overcrypt Replaying"; and FIG. 6 illustrates an alternative embodiment of the "Overcrypt Recording" system wherein encryption processing is performed in the conditional access module rather than in the security device (smart card).

With reference to FIG. 1, the conditional access system includes a conditional access module (CAM) with a common interface (CI), DVB filter and descrambling circuitry, a controller and an interface for a smart card that constitutes the security device.

In the following description and in the figures, Italic is used for data being only scrambled (for example, according to the standard DVB), Bold is used for data being only selectively encrypted; the word overcrypt is used to designate the selective encryption of data.

With reference to FIG. 2, in a standard DVB descrambling procedure (prior art):

in transport stream input (1) (TS in) encrypted control word $CW_x$ are sent in advance to the scrambled packets $X_1, X_2 \ldots X_n$;

they are filtered by DVB filter (2) for program selection;

in the control word processing means (3) of the security device, $CW_x$ are decrypted to produce decrypted ones $CW_x$; and in the descrambler (4), scrambled packets $X_1, X_2 \ldots X_n$ are then descrambled with help of $CW_x$ to produce decrypted packets $X_1, X_2 \ldots X_n$ that will then be available at the module output as a transport stream output (TS out).

With reference to FIG. 3, Overcrypt is an additional layer of encryption to standard scrambling layer of FIG. 2.

Overcrypt specific functions are:

Overcrypt packet filter (A) localised in the module to filter specific packets that are overcrypted; and CP/CP$^{-1}$ processing means (B) in the smart card (or security device) to copy protect (CP) or to remove copy protection (CP$^{-1}$).

The aim is double:

The first function ("Overcrypt descrambling") is to have a higher level of security to control access to broadcasted events by having some specific packets well chosen (background "I" frame for example) encrypted by a non public algorithm (CP that will be named "overcryption"). In the following description, bold and italic means the packet is scrambled and in addition "overcrypted". Bold only means the data is only "overcrypted". The specific well chosen packets $X_1$ are sent in advance to others to allow the decryption of these in a highly secured environment as a Smart Card. An advance of the packet is necessary as Smart Card may have low speed processing capability.

The Smart Card has received some encrypted specific control word OCW that will be decrypted in the Smart Card and the result sent to means (B) to allow decryption of $X_1$ in Smart Card. As the packets $X_1$ are major part of the picture, the display of the event without having the right data to "de-overcrypt" them will be completely scrambled. This is a solution against people who have spied the "standard" CW that are all available at the Smart Card output for a standard system. In addition these people may know the conditional access encryption algorithm as for major events' providers, this algorithm is public.

The second function ("overcrypt recording") is to offer copy protection feature to record with accompanying right management system to enable a restricted number of replay or on a restricted period.

In the overcrypt descrambling process (FIG. 3):

In the Transport Stream at the input of the conditional access module T sin (1) some well selected packets $X_1$ are "overcrypted" and sent in advance in the previous crypto period in TS in;

DVB filter (2) selects the data that are not overcrypted ($X_n$, n<>1 and $CW_x$) corresponding to the program selection and send the first one to the module descrambler (4) and second one to the Smart Card controller;

in the control word processing means (3), $CW_x$ and specific overcrypt control word $OCW_X$ (selected by A) are decrypted to produce decrypted ones $OCW_X$ and OCW. $CW_X$ are sent to the controller, OCW to CP/CP$^{-1}$ processing means (B); the advantage of having means (B) in the security device is here underlined: this location prevents a spy from being able to recover clear OCW at the output of the security device;

Overcrypt packet filter (A) selects packets $X_1$ that are overcrypted and sends it to the controller;

CP/CP$^{-1}$ processing means (B) decrypts $X_1$ to produce $X_1$ using specific control word $OCW_X$;

$X_1$ are fed to DVB filter (2) and then descrambler (4) in order to be available at the same time than the other non overcrypted packets of same picture; and descrambler (4) will then descramble $X_1, X_2 \ldots X_n$ with help of $CW_x$ to produce decrypted packets $X_1, X_2 \ldots X_n$ that will then be available at the module output as TS out.

With reference to FIG. 4, in the overcrypt recording system:

in T Sin (1) in the $RCW_X$, the right to record are managed;

the clear stream is filtered in means (A) to select some well chosen packets $X_1$ that will be copy protected (or overencrypted) in means (B) of Smart Card;

In advance, $RCW_X$ has been decrypted in (3) and fed to means (B); and

Means (B) will then forward copy protected $X_1$ in controller that will insert them at appropriate locations with the other clear packets in the output transport stream TS out.

With reference to FIG. 5, in the overcrypt replaying system:

in the T Sin (1), there is the $PCW_X$, that manages the right to replay;

The transport stream fed in the module (TS in) is overcrypted for some well chosen packets $X_1$ and clear for others;

the stream is filtered in means (A) to select some well chosen packets $X_1$ on which copy protection has to be removed in means (B) of Smart Card;

To do so, $PCW_X$ has been decrypted in advance in (3) and fed to means (B);

the clear packet $X_1$ are sent back to the controller; and the controller will insert $X_1$ at appropriate location with the other clear packet in the output transport stream TS out.

With reference to FIG. 6, in the alternative embodiment of the overcrypt recording system, the CP/CP$^{-1}$ (means B) is implemented in the module. This alternative embodiment could be also implemented for overcrypt descrambling and replaying function.

The CP rights management could be supported by the SC whereas the processing of CP($X_1$) would be made inside the module itself Exchanges of rights would then use a secured channel (SEC) between module and SC, using a session key. This reduces the processing load of the SC to the minimum.

in the $CW_X$, $RCW_X$ of T Sin (1), the rights to record are managed;

the clear stream is filtered in means (A) to select some well chosen packets $X_1$ that will be copy protected (or overencrypted) in means (B) of Module.

In advance, $RCW_X$ has been decrypted in (3) and exchanged with means (B) by a secure channel.

Means (B) will then forward copy protected $X_1$ in controller that will insert them at appropriate locations with the other clear packets in the output transport stream TS out.

Note (for all overcrypt functions): The key ($OCW_X$, $RCW_X$, $PCW_X$) for CP and CP$^{-1}$ may be fixed in the SC or, optionally, received by the air in some specific message.

CP/CP$^{-1}$ in the Smart Card is a way to provide some tools for conditional access provider to increase security level and to gain flexibility. As the specific overcrypt algorithm is in the SC, if the algorithm's secret is broken, the CA provider will only have to change the SC.

The algorithm CP/CP$^{-1}$ may be public or not.

The method to process an event that is currently broadcasted to unscramble it and to record in same time an overcrypt recording (or an overcrypt replay for PIP) may be implemented into 2 separate module or in the same module.

The module may be equipped with a controller for interfacing with the Smart Card in accordance with any standard and preferably, one of the following:

USB

USB 2, ISO 7816, 1394, Bluetooth.

The selectively encrypted data may be non-content data, such as the EMM and ECM.

Note (for all overcrypt functions):

The key (OCW) for CP and CP-1 may be fixed in the SC or, optionally, received by the air in some specific message.

CP/CP-1 in the smart card is a way to provide some tools for conditional access provider to increase security level and to gain flexibility. As the specific overcrypt algo is in the SC, if the algorithm's secret is broken, the CA provider will only have to change the SC.

the algorithm CP/CP-1 may be public or not.

the method to process an event that is currently broadcasted to unscramble it and to record in same time an overcrypt recording (or an overcrypt replay for PIP) may be implemented into 2 separate module or in the same module.

The invention claimed is:

1. A conditional access system comprising a module with descrambler circuitry and a security device adapted to be coupled to the module to provide descrambling control data to the module, said module being adapted to receive digitized data in successive data packets at least some of which are scrambled, said digitized data containing content data and access control data and said descrambling control data being derived from the access control data, wherein said conditional access system is adapted to decrypt selected ones of said data packets in addition to being scrambled, said access control data includes decryption control data and wherein said module is adapted to receive said successive data packets in a predetermined order corresponding to a continuous sequence of content data, and said selected data packets are received in advance of other data packets with respect to said predetermined order with a shift in time sufficient to allow for decryption and combination with said other data packets prior to descrambling.

2. The conditional access system of claim 1, wherein said conditional access system is adapted prior to descramble to decrypt said selected data packets using said decryption control data, said decryption control data being derived by the security device.

3. The conditional access system of claim 2, wherein decryption of said selected data packets is performed in the security device.

4. The conditional access system of claim 2, wherein decryption of said selected data packets is performed in the module and the module is coupled with the security device via a secure channel involving session keys for transmission.

5. The conditional access system of claim 1, the decryption control data being provided over the air.

6. The conditional access system of claim 1, the decryption control data being provided by the user smart card.

7. The conditional access system of claim 1, wherein a stream of descrambled data packets is analyzed, certain data packets are selected and encrypted using copy protection control data, a stream of descrambled data packets and encrypted data packets is combined, the encrypted data packets are data advanced in time with respect to descrambled data packets containing adjacent content data, and the combined data stream is stored on a mass storage media.

8. The conditional access system according to claim 7, copy protection control data being provided over the air.

9. The conditional access system according to claim 7, copy protection control data being provided by the user smart card.

10. The conditional access system according to claim 7, copy protection control data being stored with the combined data on said mass storage media.

11. The conditional access system of claim 7, wherein the combined data stream is read from the mass storage media, the encrypted data packets are determined and decrypted using decryption control data derived from copy protection control data, and the decrypted data packets are combined with other data packets of the data stream read from the storage media to provide an output stream of clear data packets.

12. The conditional access system of claim 7, wherein encryption and/or decryption of the selected data packets is performed by the security device.

13. The conditional access system of claim 7, wherein encryption and/or decryption of the selected data packets is performed by the module and the module is coupled with the security device via a secure channel involving session keys for transmission.

14. The conditional access system of claim 7, wherein the module has a controller for interfacing with the security device in accordance with one of the standards included in the group comprising USB, USB 2, ISO 7816, 1394 and Bluetooth.

15. The conditional access system of claim 1, wherein the module has a controller for interfacing with the security device in accordance with one of the standards included in the group comprising USB, USB 2, ISO 7816, 1394 and Bluetooth.

16. A copy protection management system for data streams consisting of successive data packets representing at least one continuous sequence of content data, comprising a conditional access module and a security device coupled to the conditional access module, wherein said module is adapted to analyze a stream of successive data packets, certain data packets are selected and encrypted, said module is adapted to receive said successive data packets in a predetermined order and to combine a stream of clear data packets and encrypted data packets, wherein the encrypted data packets are received in advance of the clear data packets with respect to said predetermined order with a shift in time sufficient to allow for decryption and combination with clear data packets containing adjacent content data, and the combined data stream is stored on a mass storage media along with copy protection control data.

17. The copy protection management system of claim 16, wherein the combined data stream is read from the mass storage media, the encrypted data packets are determined and decrypted using decryption control data derived from the copy protection data, and the decrypted data packets are combined with other data packets of the data stream read from the storage media to provide an output stream of clear data packets.

18. A process for providing conditional access to data, with a module with descrambler circuitry and a security device adapted to be coupled to the module to provide descrambling control data to the module, said module receiving digitized data in successive data packets at least some of which are scrambled, said digitized data containing content data and access control data and said descrambling control data being derived from the access control data, wherein selected ones of said data packets are encrypted in addition to being scrambled, said access control data includes decryption control data and wherein said successive data packets are received in a predetermined order corresponding to a continuous sequence of content data, and said selected data packets are received in advance of other data packets with respect to said predetermined order with a shift in time sufficient to allow for decryption and combination with said other data packets prior to descrambling.

* * * * *